Nov. 19, 1968  F. P. AUGER  3,411,525

FLUID SAMPLING VALVES

Filed March 26, 1965

INVENTOR

Frank Pawley Auger

BY Wenderoth, Lind & Ponack

ATTORNEYS

United States Patent Office 3,411,525
Patented Nov. 19, 1968

3,411,525
FLUID SAMPLING VALVES
Frank Pawley Auger, Surbiton, Surrey, England, assignor to The Distillers Company Limited, Edinburgh, Scotland, a British company
Filed Mar. 26, 1965, Ser. No. 442,938
Claims priority, application Great Britain, Apr. 28, 1964, 17,527/64
1 Claim. (Cl. 137—270)

ABSTRACT OF THE DISCLOSURE

A multiport valve assembly has a rotor and a stator with at least one groove in the rotor which may be selectively registered with different ports in the stator. A key plate affixed to the side of the stator away from the rotor is provided with holes and at least one groove in registry with the ports in the stator. A connecting block abutting the key plate on the side away from the stator is further provided. The connecting block has ports for introducing to and withdrawing fluid streams from the valve assembly. Furthermore, the connecting block is easily removed to permit the insertion of new key plates with different arrangements of grooves and holes in order to change the fluid circuit.

---

Figure 1:
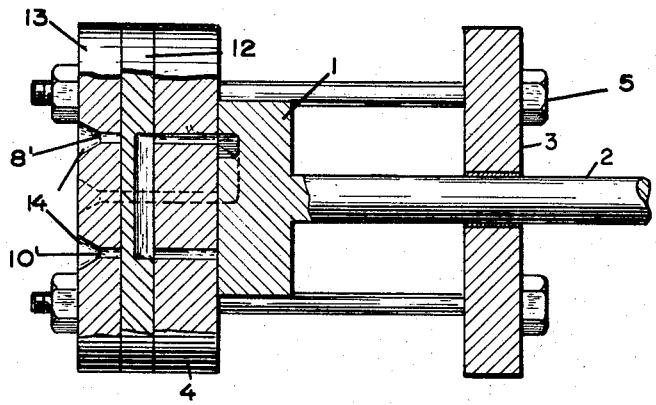

The present invention relates to apparatus and in particular to valve assemblies.

The use of multiport valves to control and direct the flow of streams of fluid samples, in particular gaseous samples, in scientific analytical equipment such as that employed for gas chromatography is known.

In such apparatus having a plurality of inlets and outlets there has been hitherto, of necessity, a large number of pipes and pipe connections external of the valve itself. This has the disadvantage that whilst the valve may be comparatively small the associated pipework greatly increases the final bulk of the whole assembly. In addition great care is necessary to ensure fluid tight seals on the pipe connections.

It is an object of the present invention to provide a multiport valve assembly in which some at least of the external pipes and pipe connections are avoided.

Accordingly the present invention is a multiport valve assembly in which a flow path offered to a fluid stream passing to or from the valve is defined by a groove and/or hole in a key plate in co-operation with a part of the valve housing.

The valve mechanism may be of any suitable known type or design. For example the essential components of the valve may comprise two ported valve blocks bearing one upon the other in gas tight contact in which switching of the flow path offered to a fluid stream passing through the valve is effected by alteration of the relative alignment of the ports in the two blocks by rotation of one block in relation to the other. Application of the present invention to such known valves involves replacement of the pipes and pipe connections associated with the ports in one of the valve blocks by a passage of series of passages formed by holes and/or grooves in a key plate attached to the back of the valve block.

The precise shape of the key plate is dependent upon the particular valve housing into which or against which it is fitted. Generally it will take the form of a flat plate machined on at least one side to fit and seal against or between similarly flat machined parts of the valve housing. The key plate is provided with a groove and/or holes or series of grooves and/or holes the precise pattern of which will be determined by a number of ports in the valve and the way in which it is desired to connect them. As will be appreciated by one skilled in the art when it is desired to alter the connections between the valve ports, it is only necessary to replace the key plate with another having a different pattern of grooves providing the desired altered connections.

The key plate may be held in contact with the valve housing by any suitable means, e.g. bolts or spring pressure.

The key plate may be fabricated of any suitable material e.g. metal or plastics material which will provide a fluid tight seal when affixed against the valve housing. Similarly the valve housing itself may suitably be fabricated of metal or plastics material e.g. Teflon.

The housing may be adapted to receive connection with a plurality of pipes in any suitable manner, for example the ports passing through the housing may be provided with nipples for direct attachment to flexible piping.

Figure 2:
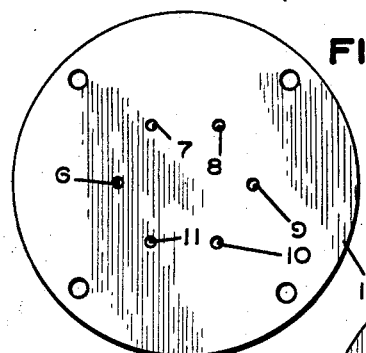
Figure 3:
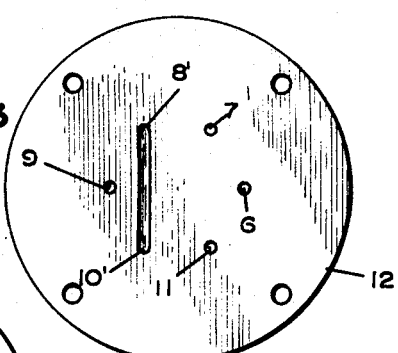
Figure 4:
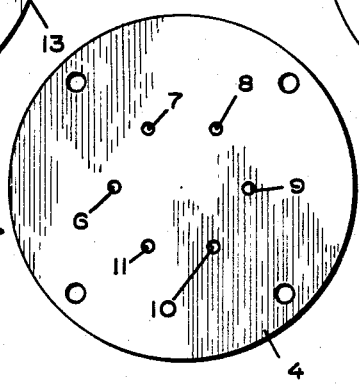
Figure 5:
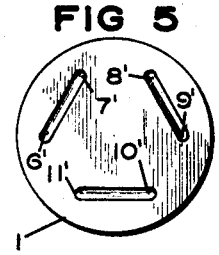
Figure 6:
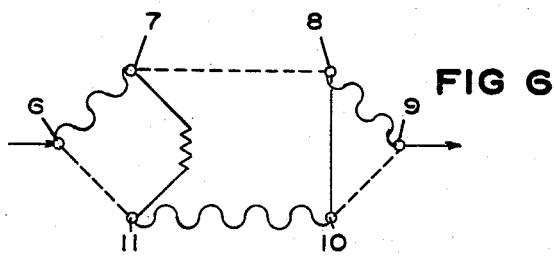

A multiport valve assembly constructed in accordance with the present invention is described in more detail with reference to the accompanying drawing in which:

FIGURE 1 represents schematically a side elevation in section of an assembly, and FIGURE 2 represents a plan view of the connecting block 13 shown in FIGURE 1 viewed along the line A–B, FIGURE 3 represents a plan view of the key plate 12 viewed along the line B–A in FIGURE 1 showing a possible system of holes and grooves, FIGURE 4 represents a plan view of the valve stator 4 viewed along the line A–B, FIGURE 5 represents a plan view of the valve rotor 1 viewed along line A–B and FIGURE 6 represents schematically a gas flow diagram of sample flows through the assembly.

Referring to FIGURES 1 to 5 a ported valve block 1 (the "rotor") supported through its centre on a shaft 2 is mounted in a bearing plate 3 so as to bear against a fixed and similarly ported valve block 4 (the "stator") attached to the bearing plate by bolts 5. The faces of blocks 1 and 4 are carefully machined or constructed of a self-lubricating material such as Teflon to provide a gas tight seal between the blocks. Valve block 4 has ports 6, 7, 8, 9, 10 and 11 and valve block 1 a series of grooves 6'–7', 8'–9' and 10'–11'.

Attached to the back of the valve "stator" block 4 is a grooved and holed key plate 12. FIGURE 3 shows such a key plate having a groove 8'–10' and holes 6, 7, 9 and 11. The groove in the plate serves in association with the back of the valve block 4 to define a passageway linking the valve ports. Attached to the other side of the key plate is a connecting block 13 having ports 14 for introduction and removal of sample streams to and from the assembly, these ports mating with holes in the key plate.

In operation rotation of the valve block 1 against the face of valve block 4 is effected by rotation of shaft 2. Such rotation causes alternation of the alignment of the ports and grooves in the two blocks such that a different flow path is offered to a fluid stream entering the assembly.

As shown in FIGURE 6 one such flow path shown as a continuous line consists of passage through port 6 in the connecting plate, key plate and valve block 4, return through groove 6'–7' in valve block 1 and ports 7 in the valve block 4, key plate and connecting plate to a chromatographic column and return one again through the assembly via ports 11 groove 11'–10' in valve block 1, port 10 in the valve block 4 groove 8'–10' in the key plate and port 10 in the connecting plate to be finally passed to a detection apparatus (not shown). An alternative flow path obtained by rotation of valve block 1 is shown in FIGURE 6 by dotted lines.

I claim:
1. A multiport valve assembly comprising in combination: a stator having first and second flat faces on oppo- site sides thereof, the stator having a plurality of ports extending between the first and second faces; a key plate abutting one face of the stator in gas tight contact therewith and having at least one groove in the face thereof abutting the stator joining at least one pair of ports in the stator, and the key plate having holes therethrough in register with ports in the stator other than those ports in the stator joined by a groove in the key plate; a connecting member abutting the key plate on the side remote from the stator, and having ports therein for introducing and withdrawing fluid streams to the valve assembly, the holes being at least equal in number to and aligned with the holes in the key plate other than those joined by the groove; and a rotor having a flat face in gas tight contact against the other flat face of the stator and having at least one groove in the flat face which can be brought into register with different pairs of ports in the stator by rotation of the rotor.

References Cited

UNITED STATES PATENTS

| | | | |
|---|---|---|---|
| 1,237,795 | 8/1917 | Liff et al. | 137—552.5 |
| 2,186,224 | 1/1940 | Wolfert | 137—270 |
| 2,335,923 | 12/1943 | Dube | 137—270 |
| 2,966,168 | 12/1960 | Hunt et al. | 137—270 |
| 3,114,393 | 12/1963 | Vlasic | 137—625.46 X |
| 3,124,335 | 3/1964 | Mason | 251—368 X |

M. CARY NELSON, *Primary Examiner.*

J. R. DWELLE, *Assistant Examiner.*